US011101593B2

(12) United States Patent
Li (10) Patent No.: US 11,101,593 B2
(45) Date of Patent: Aug. 24, 2021

(54) WALL DEVICE

(71) Applicant: HAN CHUANG INTERNATIONAL CO., LTD, Taipei (TW)

(72) Inventor: Chao-Han Li, Taipei (TW)

(73) Assignee: HAN CHUANG INIERNATIONAL CO., LTD, Taipei (TW)

( * ) Notice: Subject to any disclaimer, the term of this patent is extended or adjusted under 35 U.S.C. 154(b) by 0 days.

(21) Appl. No.: 16/820,955

(22) Filed: Mar. 17, 2020

(65) Prior Publication Data

US 2021/0203099 A1    Jul. 1, 2021

(30) Foreign Application Priority Data

Dec. 31, 2019 (TW) .................................. 108217481

(51) Int. Cl.
*H01R 13/453* (2006.01)
*H01R 13/506* (2006.01)
*H01R 24/78* (2011.01)

(52) U.S. Cl.
CPC ......... *H01R 13/453* (2013.01); *H01R 13/506* (2013.01); *H01R 24/78* (2013.01)

(58) Field of Classification Search
CPC .............. H01R 13/652; H01R 13/4534; H01R 13/4536; H01R 13/4532; H01R 25/006; H01R 13/453; H01R 13/506; H01R 24/78
USPC .......................................... 439/107, 137–139
See application file for complete search history.

(56) References Cited

U.S. PATENT DOCUMENTS

| | | | |
|---|---|---|---|
| 7,554,033 B1* | 6/2009 | Bhosale | H01H 9/04 174/53 |
| 7,963,812 B2* | 6/2011 | Ilkhanov | H01R 25/006 439/806 |
| 8,133,064 B2* | 3/2012 | Nishimura | H01R 13/447 439/107 |
| 2006/0057873 A1* | 3/2006 | Ortega | H01R 25/006 439/107 |
| 2009/0032278 A1* | 2/2009 | Weeks | H01R 13/7135 174/53 |
| 2011/0104919 A1* | 5/2011 | Patel | H01R 13/6658 439/137 |
| 2012/0170292 A1* | 7/2012 | Bhosale | H01R 13/6658 362/415 |
| 2013/0316589 A1* | 11/2013 | Lee | H01R 13/4534 439/653 |

(Continued)

*Primary Examiner* — Gary F Paumen
(74) *Attorney, Agent, or Firm* — Thomas | Horstemeyer LLP (57) ABSTRACT

A wall device is described comprising a power source base body for installation in a wall, where the power source base body comprises at least one accommodating space. The accommodating space is configured for placement of a first metal piece, a second metal piece, a third metal piece, and a fourth metal piece, where the first metal piece is a first live wire circuit, the second metal piece is a second live wire circuit, the third metal piece is an earth wire circuit, and the fourth metal piece is a neutral wire circuit. Partition plates are provided in the accommodating space to separate the positions of the first metal piece, the second metal piece, the third metal piece, and the fourth metal piece, so as to prevent the first metal piece, the second metal piece, the third metal piece, and the fourth metal piece from contacting in the accommodation space.

20 Claims, 10 Drawing Sheets

(56) References Cited

U.S. PATENT DOCUMENTS

2016/0104963 A1\* 4/2016 Savicki, Jr. .......... H01R 25/006
                                                                                                                            439/138
2017/0352978 A1\* 12/2017 Mortun ................ H01R 13/521
2020/0266574 A1\* 8/2020 Mortun .................. H01R 13/14

\* cited by examiner

WALL DEVICE

CROSS-REFERENCE TO RELATED APPLICATION

This application claims the benefit of and priority to Taiwanese (TW) Patent Application No. 108217481 filed Dec. 31, 2019, the contents of which being incorporated by reference in their entirety herein.

TECHNICAL FIELD

The present disclosure relates to a wall device, particularly to a device which forms a non-conductive status when in a normal state of operation and forms a conductive state, if necessary. The wall device described herein provides various benefits, such as heightened protection and safety, and is suitable for a wall device or similar socket structure.

BACKGROUND

Currently, most power sockets installed on or in a wall are connected to a live wire, a neutral wire, and an earth wire inside the wall, such that the power socket can provide 110V or 220V power. Therefore, a plug of an electrical product is able to be directly inserted into the power socket to obtain 110V or 220V power, which is able to be adjusted to the required voltage by a transformer located in the electrical product.

However, when a plug of an electrical product is unplugged, a hole of the power socket is left exposed on the wall, and some curious children may insert objects or long strips into the hole of the power socket, thereby easily forming a short circuit and creating sparks. Thus, the power socket may burn if a short circuit is formed for only a short time, but a long time may cause burning of the lines in the wall, which can cause a fire.

BRIEF SUMMARY OF INVENTION

A wall device is described, where the wall device is mainly provided with a power source base body installed in a wall. The power source base body comprises at least one accommodating space, the accommodating space being provided for placement of a first metal piece, a second metal piece, a third metal piece, and a fourth metal piece, where the first metal piece is a first live wire circuit, the second metal piece is a second live wire circuit, the third metal piece is an earth wire circuit, and the fourth metal piece is a neutral wire circuit. A plurality of partition plates are provided in the accommodating space to separate the positions of the first metal piece, the second metal piece, the third metal piece, and the fourth metal piece, so as to prevent the first metal piece, the second metal piece, the third metal piece, and the fourth metal piece from contacting in the accommodation space. In a normal state of operation, the first live wire circuit of the first metal piece and the second live wire circuit of the second metal piece form an open circuit as a non-conductive state, such that the inside of the power source base body is non-conductive. When needed, by combining the smart cover plate or socket cover plate with the power source base body, the inside of power source base body becomes conductive, which provides the benefit of protection and safety, and thereby increasing the convenience of the wall device.

The first usage state of the first main structure is that the power source base body 60 is combined with a decorative cover. The decorative cover does not have any holes to cover a protection plate 50 on the accommodating space of the power source base body 50 and cover other exposed surfaces of the power source base body 60, thereby protecting the power source base body 60. Thus, the power source base body 60 has an effect of preventing metal objects or other objects from falling therein, which provides protection and enhances the overall protection of the device.

Another aspect of the present disclosure provides a wall device by combining a socket cover plate with the power source base body, where the socket cover plate is provided with at least one set of socket holes. The at least one set of socket holes correspond to the at least one set of socket holes of the protection plate. The socket cover plate is combined with a contact piece, and the contact piece is provided with a first pin and a second pin. The first pin and the second pin of the contact piece of the socket cover plate are passed through holes on two sides of the cavity provided on the protection plate, where the first pin of the contact piece makes contact with the first metal piece, and the second pin of the contact piece makes contact with the second metal piece, so as to make a first live wire circuit of the first metal piece and a second live wire circuit of the second metal piece, thereby forming a closed loop having a conductive status. The socket cover plate is able to be provided for external electrical products to insert and utilize. As a result, when an electrical product needs to be utilized, the decorative cover plate is able to be replaced with the socket cover plate, so the power source base body is able to form a conductive status by combining the power source base body and the socket cover plate, and thus increasing the convenience of the device as a whole.

Another aspect of the present disclosure is to provide a wall device. The power source base body is combined with a smart cover plate. The smart cover plate comprises a socket cover plate, a circuit board, a switch, and a base. The base is provided with at least one set of socket holes and a cavity. The switch is electrically connected with the circuit board. The switch is provided with a first pin, a second pin, and third pin. The switch is provided in the cavity of the base. The first pin, the second pin, and the third pin of the switch are passed through holes of the three sides in the cavity. The socket cover plate is provided on the circuit board and combined with the base, so that the circuit board is located between the socket cover plate and the base. The socket cover plate is provided with at least one set of socket holes and one port hole. The first pin of the switch is contacted with the first metal piece, the second pin of the switch is contacted with the second metal piece, and the third pin of the switch is contacted with the fourth metal piece. Thus, the first live wire circuit of the first metal piece and the second live wire circuit of the second metal piece can form a closed loop having a conductive state. A cavity extends from the base of the smart cover plate, and a side room is extended from the power source base body. A vertical board extends from the circuit board. The vertical board is provided with a transformer, and the transformer is electrically connected with the circuit board. Because the side room of the power source base body is able to place the cavity extended from the base of the smart cover plate, the present disclosure increases space for placing the transformer of the vertical board, so that the present invention has a coexistence space of DC and AC or is changed for use of a single AC. Thereby, the values such as power, voltage, and temperature can be monitored through the smart cover plate, and the monitoring value can be remotely received by the circuit board so as to perform complete smart statistics and analysis.

DETAILED DESCRIPTION

With reference to FIGS. 1 to 10, FIGS. 1 to 10 are schematics of an embodiment of a wall device of the present invention.

Figure 1:
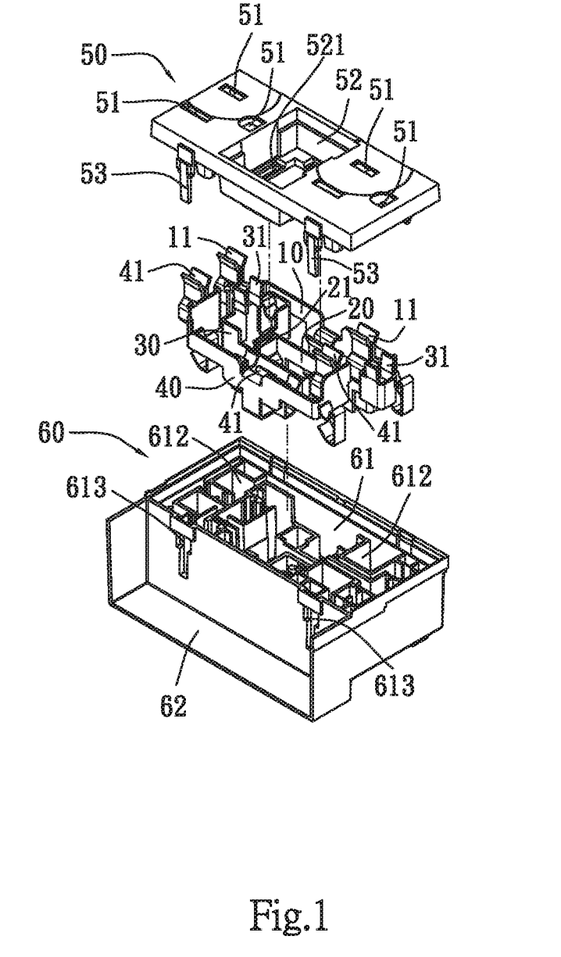
FIG. 1 shows a schematic diagram of the component decomposition of the first main structure of the present invention.
Figure 2:
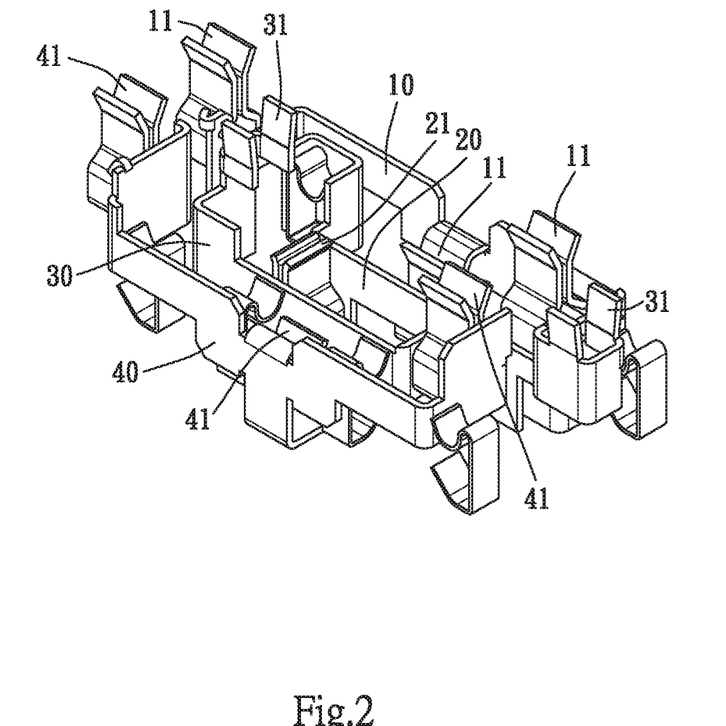
FIG. 2 shows a schematic diagram of the first metal piece, the second metal piece, the third metal piece, and the fourth metal piece of the first main structure of the present invention.

Referring to the wall device of the present embodiment, the first main structure includes a wall device comprising a first metal piece 10, a second metal piece 20, a third metal piece 30, a fourth metal piece 40, a protection plate 50, and a power source base body 60 (as shown in FIG. 1), where the first metal piece 10 comprises at least one clamp 11 and the first metal piece 10 is a first live wire circuit. The second metal piece 20 comprises at least one clamp 21, and the second metal piece 20 is a second live wire circuit. The third metal piece 30 comprises at least one clamp 31, and the third metal piece 30 is an earth wire circuit. The fourth metal piece 40 comprises at least one clamp 41, and the fourth metal piece 40 is a neutral wire circuit, and the fourth metal piece 40 and the third metal piece 30 are positioned parallel to one another, as shown in FIG. 2. Specifically, the material of the first metal piece 10, the second metal piece 20, the third metal piece 30, and the fourth metal piece 40 described above may include copper or iron. However, the first metal piece 10, the second metal piece 20, the third metal piece 30, and the fourth metal piece 40 are not limited by the mentioned material, which can be replaced with another suitable conductive material.

Further, the power source base body 60 may be installed in a wall. The wall may include a live wire, an earth wire, and a neutral wire. The live wire can receive the AC power delivered from the power system of the main switch. The neutral wire can return the current to the power system of main switch, and its potential is usually equal to or close to zero. The earth wire is connected, in series, with the conductor wire having potential equal to earth to prevent the equipment or people from being hurt by leakage. The power source base body 60 is provided with an accommodating space 61. The accommodating space 61 is provided for placing the first the first metal piece 10, the second metal piece 20, the third metal piece 30, and the fourth metal piece 40. The accommodating space 61 of the power source base body 60 is further provided with at least three holes 611, or other suitable amount of holes. A first hole 611 is provided for the live wire in the wall to be passed through and contacted with the first metal piece 10. A second hole 611 is provided for the earth wire in the wall to be passed through and contacted with the third metal piece 30. A third hole 611 is provided for the neutral wire in the wall to be passed through and contacted with the fourth metal piece 40.

Further, a plurality of partition plates 612 (as shown in FIG. 1) are provided in the accommodating space 61 of power source base body 60, and the positions of the first metal piece 10, the second metal piece 20, the third metal piece 30, and the fourth metal piece 40 are separated by the partition plates 612 so as to prevent the first metal piece 10, the second metal piece 20, the third metal piece 30, and the fourth metal piece 40 from contacting in the accommodation space 61, and thus to ensure the safety of the connection of a different circuit.

Figure 3:
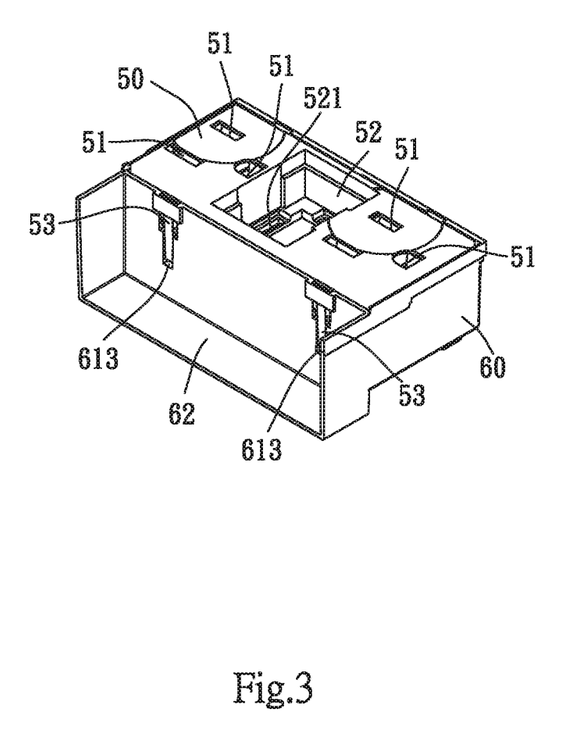
FIG. 3 shows a schematic diagram of the combination of the first main structure of the present invention.
Figure 4:
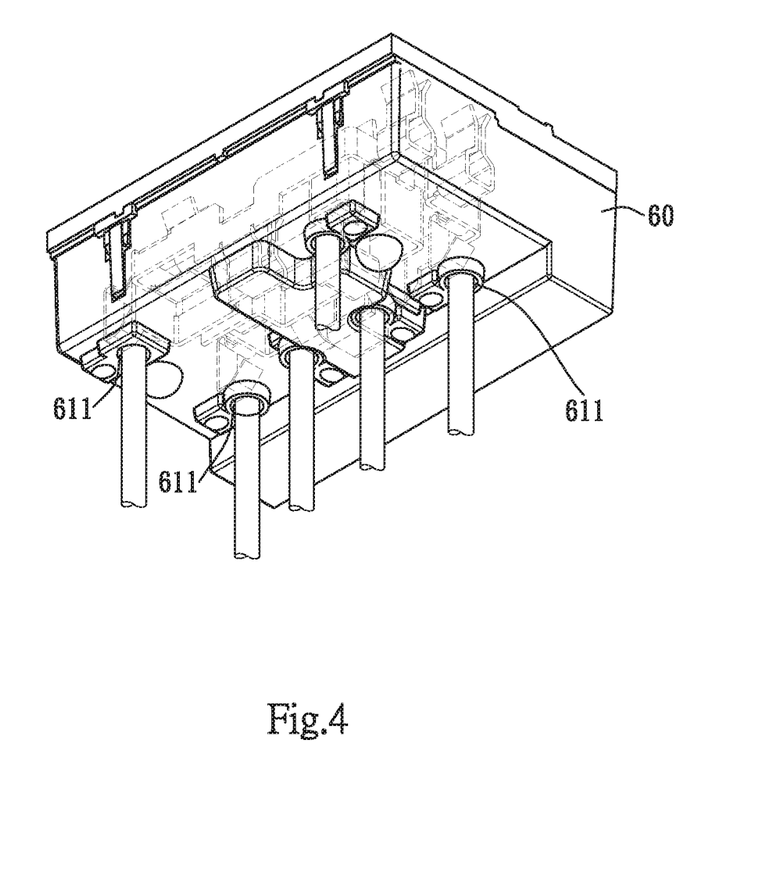
FIG. 4 shows a schematic diagram of the bottom view of the power source base body of the first main structure of the present invention.

Further, a protection plate 50 is placed on the accommodation space 61 of the power source base body (as shown in FIGS. 1 and 3). The protection plate 50 is provided with at least one set of socket holes 51 and a cavity 52, and the three sides of the cavity 52 are respectively provided with a hole 521, where the socket hole 51 of the protection plate 50 corresponds to the clamp 11 of the first metal piece 10, the clamp 31 of the third metal piece 30, and the clamp 41 of the fourth metal piece 40 as a power socket for use. The socket hole 51 may be further defined as three holes or two holes. Further, the protection plate 50 is able to be combined with the accommodating space 61 of the power source base body 60. The protection plate 50 is provided with at least two plugging parts 53. The accommodating space 61 is provided with a concave part 613 corresponding to the plugging parts 53. Through a combination of the plugging part 53 of the protection plate 50 and the concave part 613 of the accommodating space 61 (as shown in the FIG. 3), the protection plate 50 is able to cover the accommodating space 61 to protect the first metal piece 10, the second metal piece 20, the third metal piece 30, and the fourth metal piece 40 in the accommodating space 61 of the power source base body 60, so that the first metal piece 10, the second metal piece 20, the third metal piece 30, and the fourth metal piece 40 are not easily exposed, and it is not easy for objects to fall therein.

Accordingly, in a normal status, the first metal piece 10, the second metal piece 20, the third metal piece 30, and the fourth metal piece 40 of the power source base body 60 will not touch each other. The first live wire circuit of the first metal piece 10 and the second live wire circuit of the second metal piece 20 are able to form an open loop having a non-conductive status, which is a status in which no electricity is conducted. As a result, when the power source base body 60 is in the wall, although the live wire in the wall contacts the first metal piece 10, the earth wire in the wall contacts the second metal piece 20, and the neutral wire in the wall contacts the fourth metal piece 40, the power source base body 60 will not create a short circuit even though the power source base body 60 is in an unused status, which provides a high degree of safety.

Another aspect of the present disclosure provides a wall device. The power source base body 60 of the wall device is combined with a decorative cover (not shown). The decorative cover does not have any hole to cover the protection plate 50 on the accommodating space 61 of the power source base body 60 and the exposed part of the power source base body 60, thereby protecting the power source base body 60. Thus, the power source base body 60 has an effect of avoiding metal objects or other objects from falling therein, providing protection and enhancing the overall protection of the wall device.

Figure 5:
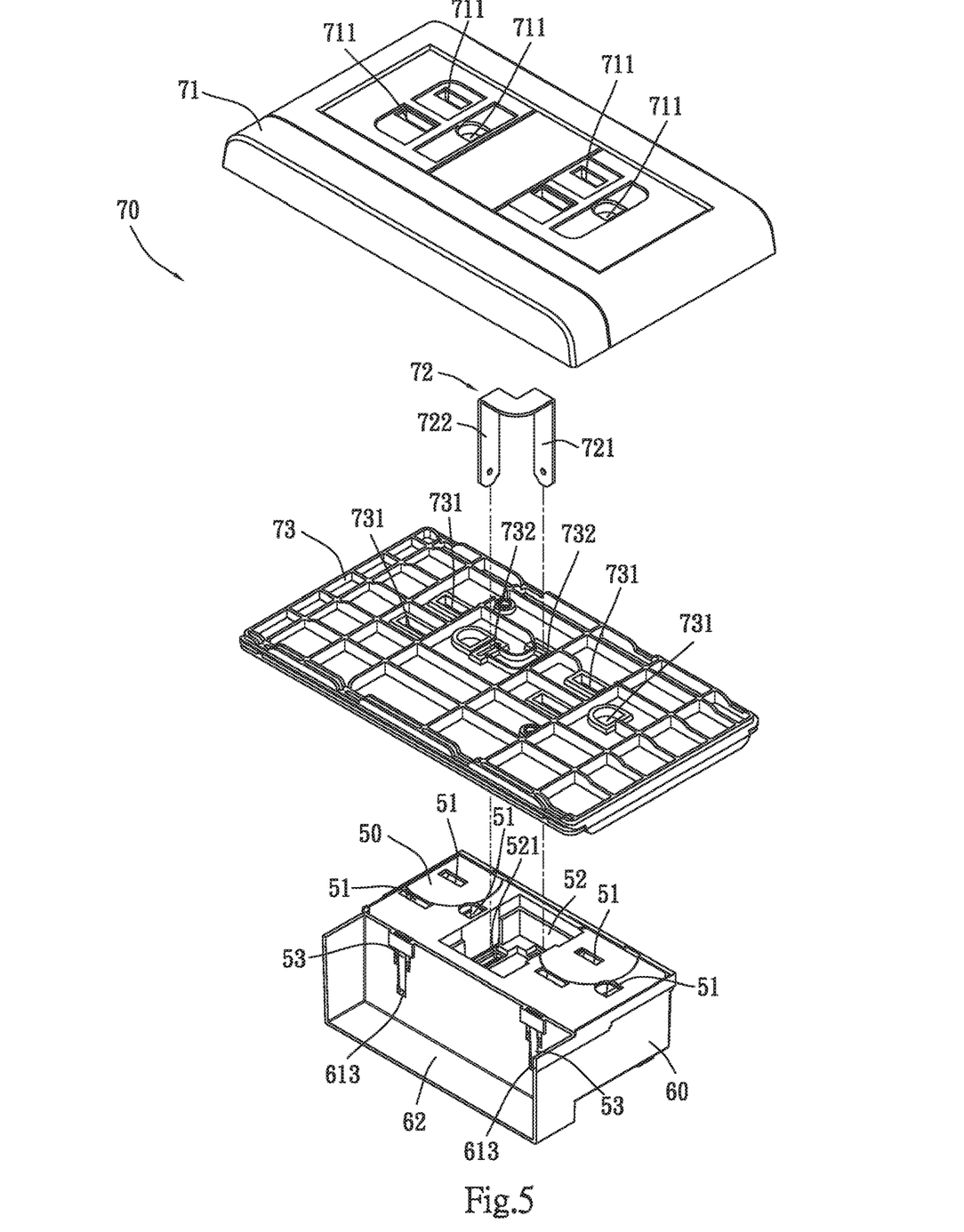
FIG. 5 shows a schematic diagram of the second usage status of the component decomposition of the first main structure of the present invention.
Figure 6:
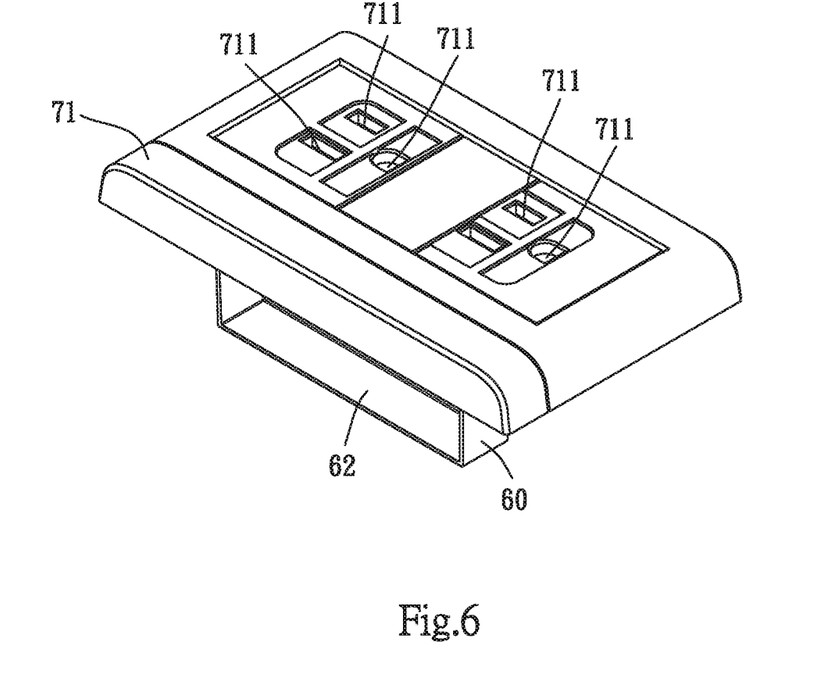
FIG. 6 shows a schematic diagram of the second usage status of the combination of the first main structure of the present invention.
Figure 7:
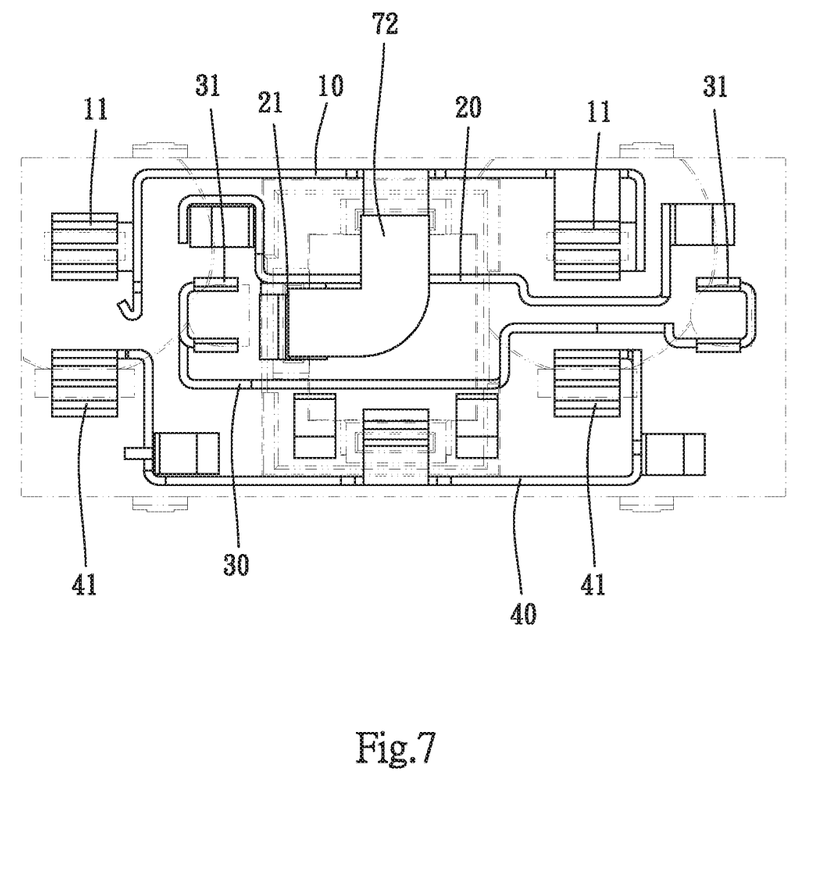
FIG. 7 shows a schematic diagram of wiring of the first metal piece, the second metal piece, the third metal piece, and the fourth metal piece of the second usage status of the first main structure of the present invention.

The second usage state of the first main structure is that the power source base body 60 is combined with a socket cover plate 70, as shown in FIGS. 5 to 7. The socket cover plate 70 comprises an upper cover 71, a contact piece 72, and a bottom plate 73, as shown in FIG. 5. The upper cover 71 is provided with at least one set of the socket holes 711, and the at least one set of the socket holes 711 are set as three holes or two holes. The inner face of the upper cover 71 is combined with a contact piece 72. The bottom plate 73 is provided with a hole 732 corresponding to the hole 731 of the contact piece 72 and the socket hole 711 of the upper cover 71. When the socket cover plate 70 is combined with and covers the power source base body 60, the bottom plate 73 of the socket cover plate 70 is positioned against the protection plate 50 and the accommodating space 61 of the power source base body 60. The socket hole 51 of the protection plate 50 corresponds to the socket hole 711 of the upper cover 71 of the socket cover plate 70 (not shown), so that the socket hole 51 of the protection plate 50 is communicated with the socket hole 711 of the upper cover 71 of the socket cover plate 70. The contact piece 72 is provided with a first pin 721 and a second pin 722 that are connected as an integral body. The first pin 721 and the second pin 722 of the contact piece 72 of the socket cover plate 70 passes through the hole 521 of the three sides in the cavity 52 of the protection plate 50. The first pin 721 is contacted with the first metal piece 10, and the second pin 722 is contacted with the second metal piece 20 (as shown in FIG. 7). Thus, the first live wire circuit of the first metal piece 10 and the second live wire circuit of the second metal piece 20 can form a closed loop as a conductive state, so that the power can be conducted. The socket hole 711 of the upper cover 71 of the socket cover plate 70 can be provided for the plug of an external electrical product to be inserted and used, thereby forming a form of a power socket.

Figure 8:
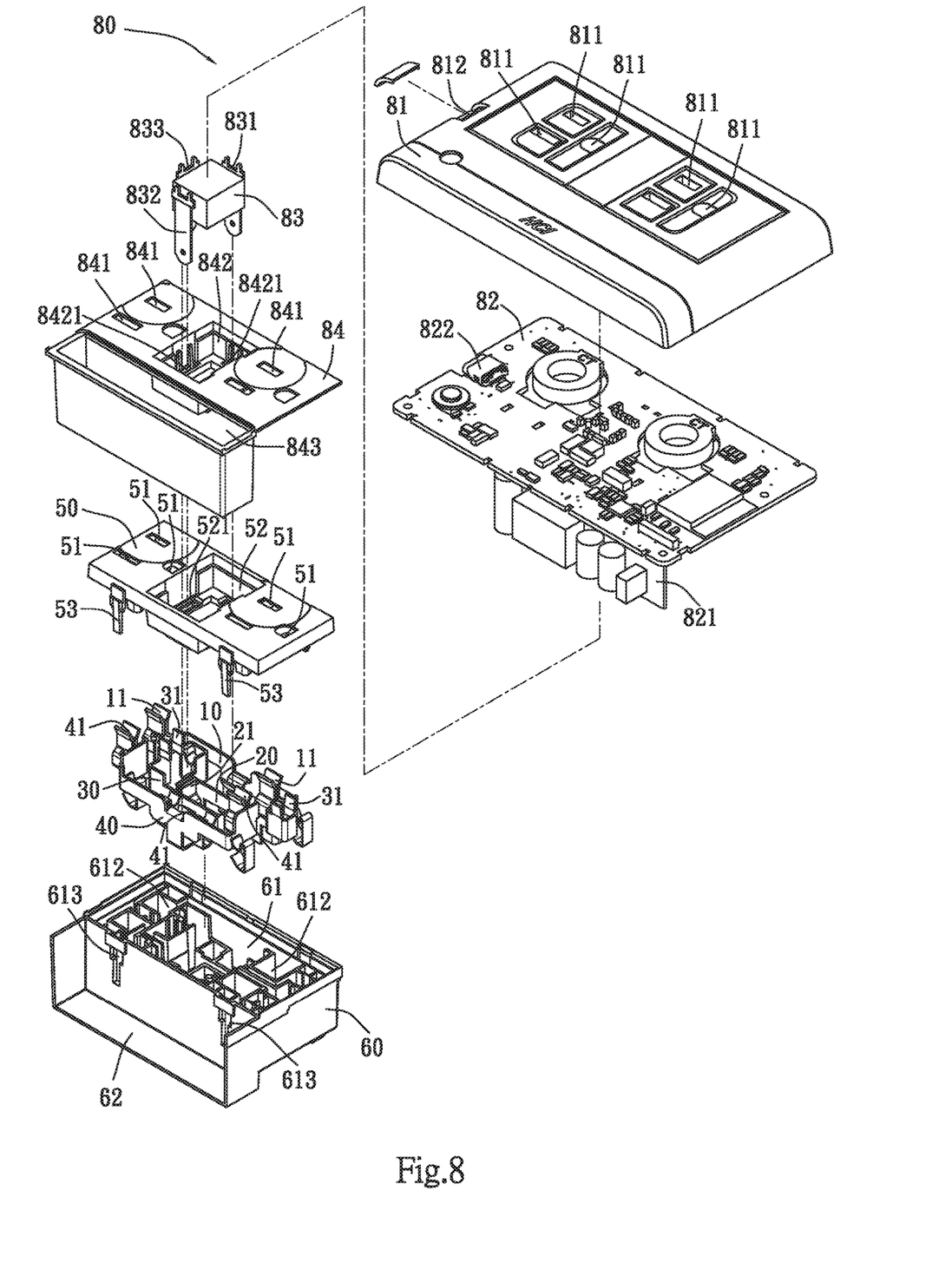
FIG. 8 shows a schematic diagram of the third usage status of the component decomposition of the first main structure of the present invention.
Figure 9:
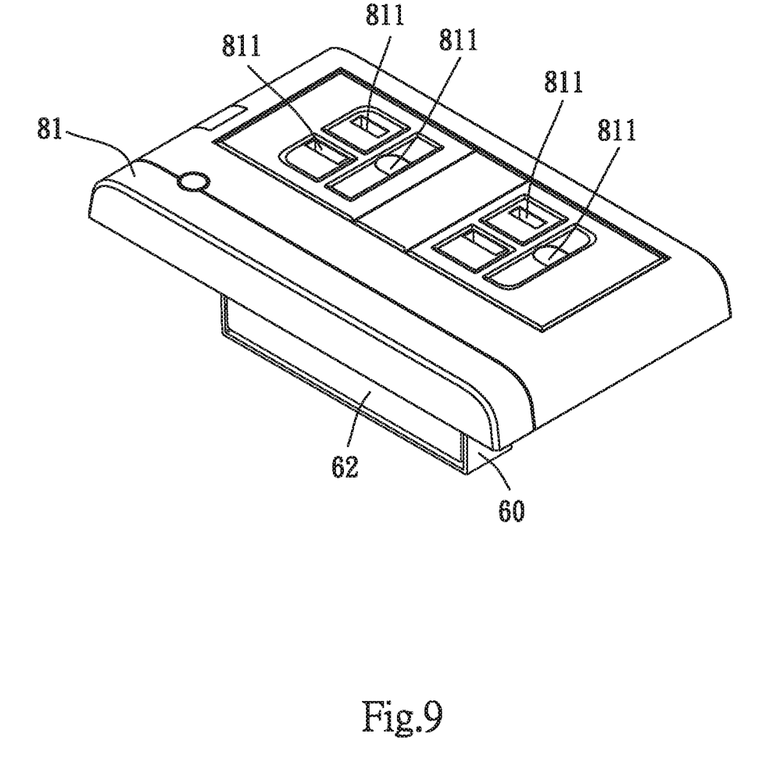
FIG. 9 shows a schematic diagram of the third usage status of the combination of the first main structure of the present invention.
Figure 10:
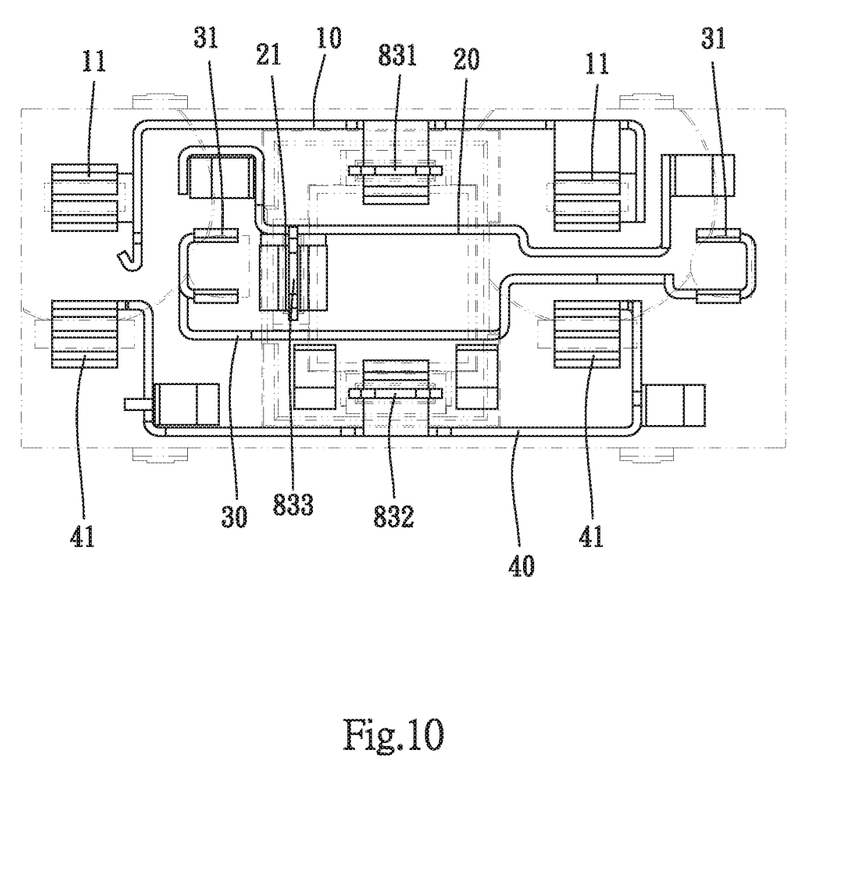
FIG. 10 shows a schematic diagram of wiring of the first metal piece, the second metal piece, the third metal piece, and the fourth metal piece of the third usage status of the first main structure of the present invention.

The third usage state of the first main structure is that the power source base body 60 is combined with a smart cover plate 80, as shown in FIGS. 8 to 10. The smart cover plate 80 comprises a socket cover plate 81, a circuit board 82, a switch 83, and a base 84. The switch 83 is electrically connected with the circuit board 82. The switch 83 is a relay or other electronic product, such as a tactile switch, push switch, slide switch, or key switch. The circuit board 82 is provided with at least one induction coil and at least one microcontroller (MCU). The MCU has an effect of integrating peripheral memory and computing functions, such as CPU, RAM, ROM, I/O, or A/D. The amount of the induction coil is designed according to the amount of the socket, and the induction coil is electrically connected with the MCU.

Further, the socket cover plate 81 of the smart cover plate 80 is provided with at least one set of socket holes 811, as shown in FIG. 8. The base 84 of the smart cover plate 80 is provided with at least one set of socket holes 841 and a cavity 842. Three sides in the cavity 842 are provided with a hole 8421. The switch 83 is provided with a first pin 831, a second pin 832, and third pin 833. The switch 83 is provided in the cavity 842 of the base 84. The first pin 831, the second pin 832, and the third pin 833 of the switch 83 are passed through the hole 8421 of the three sides in the cavity 842. The socket cover plate 81 is provided on the circuit board 82 and combined with the base 84, so that the circuit board 82 is located between the socket cover plate 81 and the base 84. When the smart cover plate 80 is combined with and covers the power source base body 60, the base 84 of the smart cover plate 80 is positioned against the protection plate 50 combined with the accommodating space 61 of the power source base body, and the socket hole 51 of the protection plate 50 corresponds to the socket hole 811 of the socket cover plate 81 of the smart cover plate 80 and the socket hole 841 of the base 84, so that the socket hole 51 of the protection plate 50 is communicated with the socket hole 811 of the socket cover plate 81. The first pin 831, the second pin 832, and the third pin 833 are passed through the hole 521 of the three sides in the cavity 52 provided on the protection plate 50. The first pin 831 of the switch 83 is contacted with the first metal piece 10, the second pin 832 of the switch 83 is contacted with the second metal piece 20, and the third pin 833 of the switch 83 is contacted with the fourth metal piece 40 as shown in FIG. 10. Thus, the first live wire circuit of the first metal piece 10 and the second live wire circuit of the second metal piece 20 can form a closed loop as a conductive status, and provides power to the circuit board 82. Thereby, the values such as power, voltage, and temperature can be monitored through the circuit board 82 of the smart cover plate 80, and the monitoring value can be remotely received by the circuit board 82 so as to perform complete smart statistics and analysis.

A cavity 843 extends from the base 84 of the smart cover plate 80, and a side room 62 extends from the power source base body 60 (as shown in FIG. 8). A vertical board 821 extends from the circuit board 82. The vertical board 821 is provided with a transformer, and the transformer is electrically connected with the circuit board 82. The transformer can convert AC power and DC power for required voltage to let the circuit board 82 provide different voltages to various electronic components for work. When the smart cover plate 80 and the power source body base 60 is combined, the vertical board 821 of the circuit board 82 extends into the cavity 843 extending from the base 84 of the smart cover plate 80, and the side room 62 of the power source base body 60 is for placing the cavity 843 of the base 84 of the smart cover plate 80. Because the side room 62 of the power source base body 60 is able to receive the cavity 843 extending from the base 84 of the smart cover plate 80, the present invention increases the space for placing the transformer of the vertical board 821, so that the present invention has a coexistence space of DC and AC or is changed into for usage of a single AC. Further, the socket cover plate 81 is provided with at least one port hole 812, the circuit board 82 is further provided with at least one universal serial bus (USB) interface socket 822, and the USB interface socket 822 of the circuit board 82 is exposed through the port hole 812 of the socket cover plate 81, as shown in FIG. 9. The USB interface socket 822 is further connected with at least one communication module. The communication module uses wireless communication technologies such as LoRa, NB-IoT, RF, ZigBee, Bluetooth, and so on to generate a wireless sensor network. Also, a wireless communication network may be composed of many automatic devices distributed in space, and through these devices, to form mutual integration and generate a smart environment or a smart home.

According to the wall device of the present invention, the second main structure is that the wall device comprises a first metal piece 10, a second metal piece 20, a third metal piece 30, a fourth metal piece 40, a protection plate 50, a power source base body 60, and a socket cover plate 70 (not shown). Alternatively, referring to the socket cover plate 70 in the second usage of the first main structure, the difference between the second main structure and the second usage status of the first main structure is that there is no upper cover 71 and bottom plate 73 in the second main structure. The first metal piece 10 is further provided with at least one clamp 11, and the first metal piece 10 is a first live wire circuit, the second metal piece 20 is further provided with at least one clamp 21, and the second metal piece 20 is a second live wire circuit, the third metal piece 30 is further provided with at least one clamp 31, and the third metal piece 30 is an earth wire circuit, the fourth metal piece 40 is further provided with at least one clamp 41, and the fourth metal piece 40 is a neutral wire circuit, and the fourth metal piece 40 and the third metal piece 30 are positioned parallel to one another, as shown in FIG. 2. Further, the material of the first metal piece 10, the second metal piece 20, the third metal piece 30, and the fourth metal piece 40 described above is copper or iron. However, the first metal piece 10, the second metal piece 20, the third metal piece 30, and the fourth metal piece 40 are not limited by the mentioned material, which can be altered with another suitable conductive material.

The power source base body 60 is installed in the wall. The wall is provided with a live wire, earth wire, and neutral wire. The live wire can receive the AC power delivered from the power system of the main switch. The neutral wire can return the current to the power system of main switch, and its potential is usually equal to or close to zero. The earth wire is connected, in series, with the conductor wire having potential equal to earth to prevent the equipment or people from hurt by leakage. The power source base body 60 is provided with an accommodating space 61. The accommodating space 61 is provided for placing the first the first metal piece 10, the second metal piece 20, the third metal piece 30, and the fourth metal piece 40. The accommodating space 61 of the power source base body is further provided with at least three holes 611. A first hole 611 is provided for the live wire in the wall to be passed through and contacted with the first metal piece 10. A second hole 611 is provided for the earth wire in the wall to be passed through and contacted with the third metal piece 30. A third hole 611 is provided for the neutral wire in the wall to be passed through and contacted with the fourth metal piece 40.

Further, a plurality of partition plates 612 are provided in the accommodating space 61 of power source base body 60, and the positions of the first metal piece 10, the second metal piece 20, the third metal piece 30 and the fourth metal piece 40 are separated by the partition plates 612, so as to prevent the first metal piece 10, the second metal piece 20, the third metal piece 30, and the fourth metal piece 40 from contacting in the accommodation space 61, and thus to ensure the safety of connection of different circuit. Further, a protection plate 50 is provided on the accommodation space 61 of power source base body 60, the protection plate 50 is provided with at least one set of socket holes 51 and a cavity 52, and the three sides of the cavity 52 are respectively provided with a hole 521, the socket hole 51 of the protection plate 50 are corresponding to the clamp 11 of the first metal piece 10, the clamp 31 of the third metal piece 30 and the clamp 41 of the fourth metal piece 40 as a power socket for use. The protection plate 50 is able to be combined on the accommodating space 61 of the power source base body 60. The protection plate 50 is provided with at least two plugging parts 53. The accommodating space 61 of the power source base body 60 is provided with a corresponding concave part 613. The plugging part 53 of the protection plate 50 is combined with the concave part 613 of the accommodating space 61, so that the protection plate 50 is able to cover the accommodating space 61 to protect the first metal piece 10, the second metal piece 20, the third metal piece 30, and the fourth metal piece 40 from exposing.

The socket cover plate 70 is combined with power source base body 60. The socket cover plate 70 is provided with at least one set of socket holes, not shown in Fig. (Or referring to the socket cover plate 70 in the second usage of the first main structure, and the difference between the second main structure and the second usage status of the first main structure is that there is no upper cover 71 and bottom plate 73 in the second main structure). The socket hole is corresponding to the socket hole 51 of the protection plate 50. The socket hole is set as three holes or two holes. When the socket cover plate 70 is combined with and cover the power source base body 60, the socket cover plate 70 is against to the protection plate 50 combined with the accommodating space 61 of the power source base body 60. The socket hole 51 of the protection plate 50 is corresponding to the socket hole of the socket cover plate 70 (not shown in Fig.), so that the socket hole 51 of the protection plate 50 is communicated with the socket hole 701 of the socket cover plate 70. The socket cover plate 70 is combined with a contact piece 72. The contact piece 72 is provided with a first pin 721 and a second pin 722 are connected as an integrally body. The first pin 721 and the second pin 722 of the contact piece 72 of the socket cover plate 70 is passed through the hole 521 of the three sides in the cavity 52 of the protection plate 50. The first pin 721 is contacted with the first metal piece 10, and the second pin 722 is contacted with the second metal piece 20. Thus, the first live wire circuit of the first metal piece 10 and the second live wire circuit of the second metal piece 20 can form a closed loop as a conductive state, so that the power can be conducted. The socket hole of the socket cover plate 70 can be provided for the plug of an external electrical product to be inserted and used, thereby forming a form of a power socket.

What is claimed is:

1. A wall device, comprising:
   a first metal piece, the first metal piece being a first live wire circuit;
   a second metal piece, the second metal piece being a second live wire circuit, and the second metal piece and the first metal piece being in parallel;
   a third metal piece, the third metal piece being an earth wire circuit, and the third metal piece and the second metal piece being in parallel;
   a fourth metal piece, the fourth metal piece being a neutral wire circuit, and the fourth metal piece and the third metal piece being in parallel;
   a protection plate, the protection plate provided with at least a set of socket holes and a cavity, where at least three sides of the cavity are respectively provided with a hole; and
   a power source base body, the power source base body configured for installation in a wall, and the power source base body comprising at least one accommodating space, the protection plate being configured for placement on the at least one accommodating space, and the at least one accommodating space being provided for placement of the first metal piece, the second metal piece, the third metal piece, and the fourth metal piece, wherein a plurality of partition plates are provided in the at least one accommodating space to separate positions of the first metal piece, the second metal piece, the third metal piece and the fourth metal piece, so as to prevent the first metal piece, the second metal piece, the third metal piece, and the fourth metal piece from contacting in the accommodation space.

2. The wall device according to claim 1, wherein:
a live wire, an earth wire, and a neutral wire are provided in the wall;
the at least one accommodating space is provided with at least three holes;
a first one of the three holes is provided for the live wire in the wall to pass through and contact the first metal piece;
a second one of the holes is provided for the earth wire in the wall to pass through and contact the third metal piece; and
a third one of the holes is provided for the neutral wire in the wall to pass through and contact the fourth metal piece.

3. The wall device according to claim 1, wherein:
the protection plate comprises at least two plugging parts;
the at least one accommodating space of the power source base body is provided with a corresponding concave part; and
the at least two plugging parts of the protection plate are combined with the corresponding concave part of the at least one accommodating space, so that the protection plate is able to be combined with the at least one accommodating space.

4. The wall device according to claim 1, wherein:
the first metal piece is provided with at least one clamp;
the second metal piece is provided with at least one clamp;
the third metal piece is provided with at least one clamp; and
the fourth metal piece is provided with at least one clamp.

5. The wall device according to claim 1, wherein:
the power source base body is further combined with a socket cover plate;
the socket cover plate is composed of an upper cover, a contact piece, and a bottom plate;
the upper cover is provided with at least a set of socket holes;
the contact piece is combined with an inner surface of the upper cover; and
the bottom plate is provided with a hole corresponding to the contact piece and a hole corresponding to the socket hole of the upper cover, so that the contact piece is able to penetrate through the hole provided on the bottom plate corresponding to the contact piece.

6. The wall device according to claim 5, wherein the contact piece further comprises a first pin and a second pin, the first pin and the second pin being connected as an integral body, wherein the first pin of the contact piece contacts the first metal piece and the second pin of the contact piece contacts the second metal piece.

7. The wall device according to claim 1, wherein the power source base body is further combined with a decorative cover, the decorative cover not having any hole to cover the power source base body.

8. The wall device according to claim 1, wherein:
the power source base body is further combined with a smart cover plate, the smart cover plate comprising a socket cover plate, a circuit board, a switch, and a base;
the socket cover plate comprises at least one set of socket holes;
the base comprises at least one set of socket holes and a cavity, three sides of the cavity being provided with a hole;
the switch is electrically connected to the circuit board;
the switch comprises a first pin, a second pin, and a third pin;
the switch is positioned in the cavity of the base;
the first pin, the second pin, and the third pin of the switch are positioned through the holes of the three sides in the cavity; and
the socket cover plate is provided on the circuit board and combined with the base, so that the circuit board is located between the socket cover plate and the base.

9. The wall device according to claim 8, wherein the circuit board further comprises at least one universal serial bus (USB) interface socket, the socket cover plate being provided with at least one port hole, and the at least one USB interface socket being configured to be exposed through the port hole of the socket cover plate.

10. The wall device according to claim 9, wherein the at least one USB interface socket is further connected with at least one communication module.

11. The wall device according to claim 8, wherein:
the base of the smart cover plate defines a cavity;
the power source base body defines a side room;
the circuit board comprises a vertical board, the vertical board being provided with a transformer, the transformer being electrically connected with the circuit board and, when the smart cover plate and the power source body base is combined, the vertical board of the circuit board extends into the cavity defined by the base of the smart cover plate, and
the side room of the power source base body is configured for placing the cavity of the base of the smart cover plate.

12. The wall device according to claim 1, wherein the socket hole is further set as three holes or two holes.

13. The wall device according to claim 5, wherein the socket hole is further set as three holes or two holes.

14. The wall device according to claim 8, wherein the socket hole is further set as three holes or two holes.

15. A wall device, comprising:
a first metal piece, the first metal piece being a first live wire circuit;
a second metal piece, the second metal piece being a second live wire circuit, and the second metal piece and the first metal piece being in parallel;
a third metal piece, the third metal piece being an earth wire circuit, and the third metal piece and the second metal piece being in parallel;
a fourth metal piece, the fourth metal piece being a neutral wire circuit, and the fourth metal piece and the third metal piece being in parallel;
a protection plate, the protection plate comprising at least a set of socket holes and a cavity, wherein at least three sides of the cavity are respectively provided with a hole; and
a power source base body, the power source base body configured to be positioned in a wall, and the power source base body comprising at least one accommodating space, wherein the protection plate is placed on the at least one accommodating space, and the at least one accommodating space is configured for placement of the first metal piece, the second metal piece, the third metal piece, and the fourth metal piece, and a plurality of partition plates are provided in the at least one accommodating space to separate positions of the first metal piece, the second metal piece, the third metal piece, and the fourth metal piece, so as to prevent the first metal piece, the second metal piece, the third metal piece, and the fourth metal piece from contacting in the accommodation space; and a socket cover plate, the socket cover plate being combined with the power source base body, the socket provided with at least one set of socket holes, and the at least one set of socket holes corresponding to the at least one set of socket holes of the protection plate, wherein the socket cover plate is combined with a contact piece, and the contact piece is provided with a first pin and a second pin, the first pin and the second pin of the contact piece of the socket cover plate passing through the holes on two sides of the cavity provided on the protection plate, wherein the first pin of the contact piece contacts the first metal piece, and the second pin of the contact piece contacts the second metal piece.

16. The wall device according to claim 15, wherein:

a live wire, an earth wire, and a neutral wire are provided in the wall; and the at least one accommodating space is provided with at least three holes, a first one of the holes provided for the live wire in the wall to be passed through and contact the first metal piece, a second hole provided for the earth wire in the wall to be passed through and contact with the third metal piece, and a third hole provided for the neutral wire in the wall to be passed through and contact the fourth metal piece.

17. The wall device according to claim 15, the protection plate comprises at least two plugging parts, the at least one accommodating space of the power source base body being provided with a corresponding concave part, the at least two plugging parts of the protection plate being combined with the corresponding concave part of the at least one accommodating space so that the protection plate is able to be combined with the at least one accommodating space.

18. The wall device according to claim 15, wherein the first metal piece is further provided with at least one clamp, the second metal piece is provided with at least one clamp, the third metal piece is provided with at least one clamp, and the fourth metal piece is provided with at least one clamp.

19. The wall device according to claim 15, wherein the first pin and the second pin of the contact piece are connected with each other.

20. The wall device according to claim 15, wherein the socket hole is further set as three holes or two holes.

* * * * *